United States Patent
Zhang et al.

(10) Patent No.: US 12,334,037 B2
(45) Date of Patent: Jun. 17, 2025

(54) DYNAMIC FRAME RATE OPTIMIZATION

(71) Applicant: QUALCOMM Incorporated, San Diego, CA (US)

(72) Inventors: Nan Zhang, Beijing (CN); Xinchao Yang, Shanghai (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/433,214

(22) Filed: Feb. 5, 2024

(65) Prior Publication Data

US 2024/0177691 A1    May 30, 2024

Related U.S. Application Data

(63) Continuation of application No. 18/041,386, filed as application No. PCT/CN2020/122651 on Oct. 22, 2020.

(51) Int. Cl.
*G09G 5/18* (2006.01)
(52) U.S. Cl.
CPC ....... *G09G 5/18* (2013.01); *G09G 2340/0435* (2013.01)
(58) Field of Classification Search
CPC ............. G09G 5/18; G09G 2340/0435; G09G 2320/0247; G09G 2330/021; G09G 5/12;
(Continued)

(56) References Cited

U.S. PATENT DOCUMENTS

2007/0057952 A1    3/2007   Swedberg et al.
2008/0055318 A1    3/2008   Glen
(Continued)

FOREIGN PATENT DOCUMENTS

| CN | 104917990 A | 9/2015 |
| CN | 106933328 A | 7/2017 |
| CN | 110035328 A | 7/2019 |

OTHER PUBLICATIONS

International Preliminary Report On Patentability—PCT/CN2020/122651—The International Bureau of WIPO—Geneva, Switzerland—May 4, 2023.
(Continued)

*Primary Examiner* — Premal R Patel
(74) *Attorney, Agent, or Firm* — Polsinelli

(57) ABSTRACT

Systems, methods, and non-transitory media are provided for dynamically switching frame rates without changing a display refresh rate. An example method can include receiving, from a display device associated with a computing device, a set of control signals indicating a display refresh rate implemented by the display device; adjusting a frame rate associated with application data from one or more applications executed on the computing device; synchronizing, based on the set of control signals, the adjusted frame rate with two or more display refresh cycles, each display refresh cycle being based on the display refresh rate; providing, to the display device, a first frame at the adjusted frame rate, the first frame being generated based on the application data; and displaying the first frame at the display device implementing the display refresh rate.

25 Claims, 8 Drawing Sheets

(58) Field of Classification Search
CPC ........... G09G 2360/08; G09G 2370/04; G09G 5/005; G09G 2360/02; G09G 2360/121; G06F 3/1407; H04N 5/04
See application file for complete search history.

(56) References Cited

U.S. PATENT DOCUMENTS

| | | |
|---|---|---|
| 2015/0189126 A1* | 7/2015 | Xie .................... G09G 5/005 |
| | | 348/500 |
| 2015/0348509 A1 | 12/2015 | Verbeure et al. |
| 2016/0127614 A1 | 5/2016 | Molnar |
| 2016/0275908 A1 | 9/2016 | Kim |
| 2016/0322032 A1 | 11/2016 | Kwa et al. |
| 2017/0053620 A1 | 2/2017 | Law et al. |
| 2018/0261143 A1 | 9/2018 | Peng et al. |
| 2020/0043223 A1 | 2/2020 | Leiby et al. |
| 2020/0160591 A1* | 5/2020 | Leiby ............... G02B 27/0093 |
| 2020/0184934 A1 | 6/2020 | Choi et al. |
| 2021/0168419 A1* | 6/2021 | Lee ................ H04N 21/64322 |
| 2023/0222992 A1 | 7/2023 | Zhang et al. |

OTHER PUBLICATIONS

International Search Report and Written Opinion—PCT/CN2020/122651—ISA/EPO—Jul. 29, 2021.
Supplementary European Search Report—EP20958138—Search Authority—Munich—Jun. 27, 2024.

* cited by examiner

DYNAMIC FRAME RATE OPTIMIZATION

CROSS-REFERENCE TO RELATED APPLICATIONS

This application is a continuation of U.S. Non-Provisional application Ser. No. 18/041,386, filed Feb. 10, 2023, which is a National Stage Application under 35 U.S.C. 371 of International Application No. PCT/CN2020/122651, filed Oct. 22, 2020, which are hereby incorporated by reference, in their entirety and for all purposes.

TECHNICAL FIELD

The present disclosure generally relates to optimizing dynamic frame rate changes for displaying visual content.

BACKGROUND

Electronic displays are commonly integrated into a wide array of electronic devices such as cameras, mobile phones, smart wearables, personal computers, televisions, extended reality (e.g., augmented reality, virtual reality, mixed reality) devices, and many other devices. The displays allow electronic devices to present visual content, such as text, videos and images, generated and/or obtained by the electronic devices. The displays can present different visual content by refreshing the visual content at certain time intervals. In some cases, a display can support different refresh rates, which allows the display to increase or decrease the number of times per second that the display updates the visual content it presents. For example, a display can adapt the display refresh rate to the frame rate delivered by the electronic device to the display. The frame rate of an electronic device can describe the number of times per second that the electronic device sends new or updated visual content to the display for presentation.

BRIEF SUMMARY

Disclosed are systems, methods, and computer-readable media for optimizing dynamic frame rate changes for displaying visual content. According to at least one example, a method is provided for optimizing dynamic switching of frame rates. The method can include receiving, from a display device associated with a computing device, a set of control signals indicating a display refresh rate implemented by the display device; adjusting a frame rate associated with application data from one or more applications executed on the computing device; synchronizing, based on the set of control signals, the adjusted frame rate with two or more display refresh cycles, each display refresh cycle being based on the display refresh rate; providing, to the display device, a first frame at the adjusted frame rate, the first frame being generated based on the application data; and displaying the first frame at the display device implementing the display refresh rate.

According to at least one example, a non-transitory computer-readable medium is provided for optimizing dynamic switching of frame rates. The non-transitory computer-readable medium can include instructions stored therein which, when executed by one or more processors, cause the one or more processors to receive, from a display device associated with a computing device, a set of control signals indicating a display refresh rate implemented by the display device; adjust a frame rate associated with application data from one or more applications executed on the computing device; synchronize, based on the set of control signals, the adjusted frame rate with two or more display refresh cycles, each display refresh cycle being based on the display refresh rate; provide, to the display device, a first frame at the adjusted frame rate, the first frame being generated based on the application data; and display the first frame at the display device implementing the display refresh rate.

According to at least one example, an apparatus is provided for optimizing dynamic switching of frame rates. The apparatus can include a memory and one or more processors configured to receive, from a display device, a set of control signals indicating a display refresh rate implemented by the display device; adjust a frame rate associated with application data from one or more applications executed on the apparatus; synchronize, based on the set of control signals, the adjusted frame rate with two or more display refresh cycles, each display refresh cycle being based on the display refresh rate; provide, to the display device, a first frame at the adjusted frame rate, the first frame being generated based on the application data; and display the first frame at the display device implementing the display refresh rate.

According to at least one example, another apparatus is provided for optimizing dynamic switching of frame rates. The apparatus can include means for receiving, from a display device, a set of control signals indicating a display refresh rate implemented by the display device; adjusting a frame rate associated with application data from one or more applications executed on the apparatus; synchronizing, based on the set of control signals, the adjusted frame rate with two or more display refresh cycles, each display refresh cycle being based on the display refresh rate; providing, to the display device, a first frame at the adjusted frame rate, the first frame being generated based on the application data; and displaying the first frame at the display device implementing the display refresh rate In some aspects, the method, computer-readable medium and apparatuses described above can include providing, to the display device, a plurality of frames at the adjusted frame rate, the plurality of frames being generated based on additional application data associated with the one or more applications; and displaying the plurality of frames at the display device without modifying the display refresh rate at the display device. In some examples, providing the plurality of frames at the adjusted frame rate can include, every two or more display refresh cycles, transmitting, to the display device, a different frame from the plurality of frames.

In some examples, the frame rate is adjusted during a runtime of the one or more applications, and the frame rate is adjusted and the first frame is displayed without changing the display refresh rate implemented by the display device.

In some examples, a first time interval associated with the adjusted frame rate is different than a second time interval associated with the display refresh rate.

In some cases, providing the first frame at the adjusted frame rate can include rendering the application data at the adjusted frame rate, composing the first frame at the adjusted frame, and/or transmitting the first frame to the display device at the adjusted frame rate.

In some cases, providing the first frame at the adjusted frame rate can include generating and transmitting the first frame at the adjusted frame rate. In some cases, providing the first frame at the adjusted frame rate can include transmitting, to the display device, the first frame at a time interval corresponding to the two or more display refresh cycles.

In some examples, synchronizing the adjusted frame rate with two or more display refresh cycles can include triggering the providing of the first frame to the display device at a time interval corresponding to the two or more display refresh cycles.

In some aspects, the method, computer-readable medium and apparatuses described above can include switching from the adjusted frame rate to a different frame rate, the different frame rate being equal to the display refresh rate; synchronizing, based on one or more additional control signals received from the display device, the different frame rate with a display refresh cycle associated with the display refresh rate; providing, to the display device, a second frame at the different frame rate; and displaying the second frame at the display device without modifying the display refresh rate at the display device. In some examples, the second frame is generated based on additional application data associated with the one or more applications, and the switching from the adjusted frame rate to the different frame rate is performed at runtime. In some cases, providing the second frame can include rendering, composing, and transmitting the second frame at the different frame rate.

In some examples, the frame rate is adjusted based on the set of control signals, a power consumption at the computing device, and/or one or more characteristics of the application data.

In some aspects, the apparatus described above can include one or more sensors. In some examples, the apparatus described above can include a mobile phone, a wearable device, a display device, a mobile computer, a head-mounted device, and/or a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
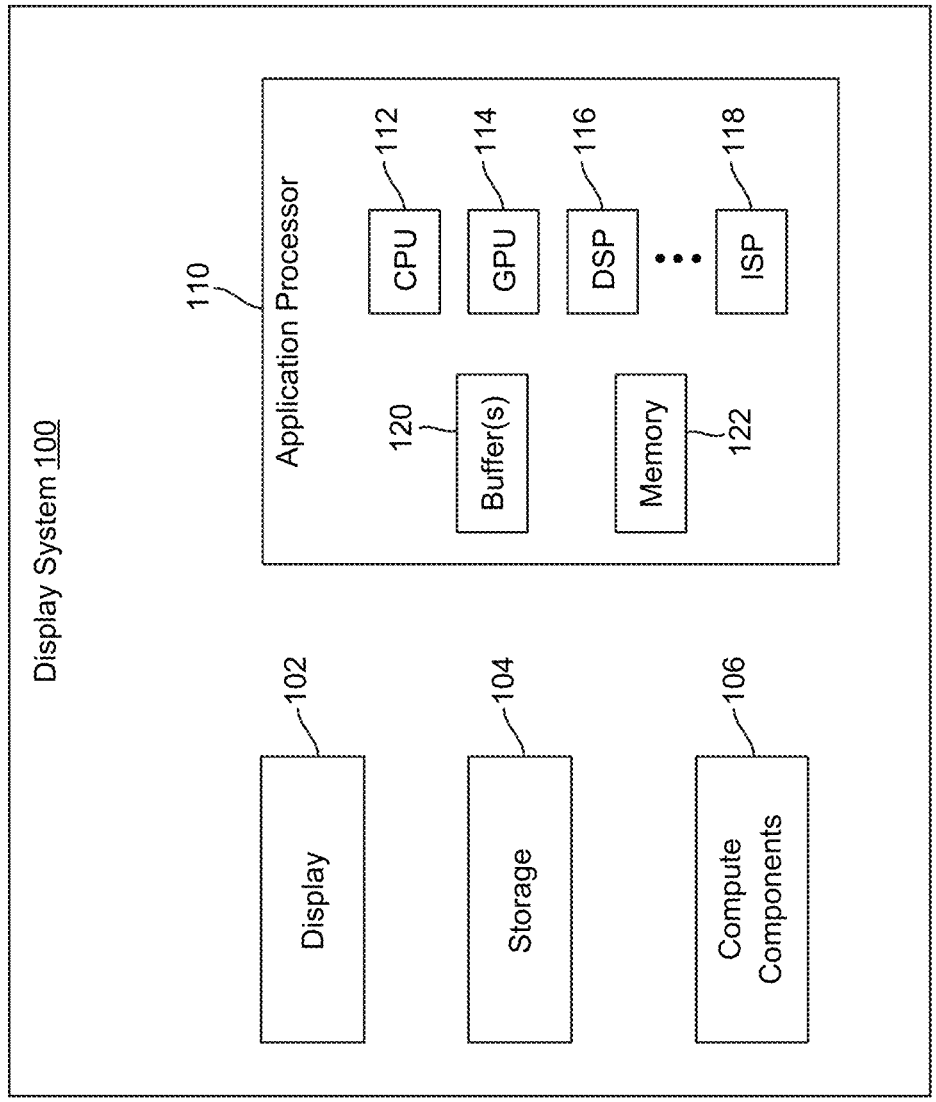
FIG. 1 is a simplified block diagram illustrating an example content display system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, electronic displays can be integrated with electronic devices to allow the electronic devices to present visual content (e.g., graphics, text, videos, images or frames, etc.) generated and/or obtained by the electronic devices. The electronic devices can include and/or interface with various types of electronic displays such as, for example, light-emitting diode (LED) displays, quantum LED (QLED) displays, organic light-emitting diode (OLED) displays, liquid crystal displays (LCDs), among others. An electronic display can present different visual content by refreshing the visual content at certain time intervals. In some cases, an electronic display can support different refresh rates, which allows the electronic display to increase or decrease the number of times per second the display updates the visual content it presents. For example, an electronic display can adapt a refresh rate of the electronic display according to (e.g., to match) the frame rate (e.g., frames per second) delivered by an electronic device to the display. The frame rate of an electronic device can describe the number of frames per second (FPS) sent by the electronic device to the display for presentation.

In some examples, the refresh rate of an electronic display can be changed and/or controlled by charging pixels (or pixel circuits) and/or LEDs on the electronic display. However, charging and discharging pixels and/or LEDs can be difficult to control, and can lead to undesirable side-effects in the quality of the visual content presented by the electronic display and the performance of the electronic display. Moreover, changing the refresh rate of an electronic display can affect the optics and color of the electronic display. For example, switching the refresh rate of an electronic display from a higher FPS, such as 120 hertz (Hz), to a lower FPS, such as 60 Hz, can lead to strong color shifts as well as changes in luminance, color, temperature, and/or color gamut. In some cases, switching an electronic display's refresh rate during runtime can lead to unwanted side-effects such as visual flickering, which can negatively impact the display's performance and the user's experience.

An electronic device may change the frame rate used to deliver frames to the display and the refresh rate of the display in order to reduce power consumption, match the refresh rate of the display to the frame rate of the electronic device, adapt to changes in the visual content (e.g., changes in motion, scene changes, changes in color and/or optics, etc.) generated and/or provided by an application on the electronic device, reduce response or lag times in displaying visual content updates, among other reasons. However, switching the electronic display's refresh rate can also produce negative results such as visual flickering and/or other unwanted visual side-effects. In some examples, the disclosed technologies address these and other challenges with variable frame and refresh rates. In some cases, the disclosed technologies can dynamically switch an electronic device's frame rate while maintaining the display's refresh rate unchanged. For example, the disclosed technologies can dynamically switch the electronic device's frame rate in software while maintaining the physical display's refresh rate. This way, the electronic device can dynamically vary a frame rate at runtime without changing the display's refresh rate, and avoid issues such as visual flickering that can result from changing a display's refresh rate.

Figure 6:
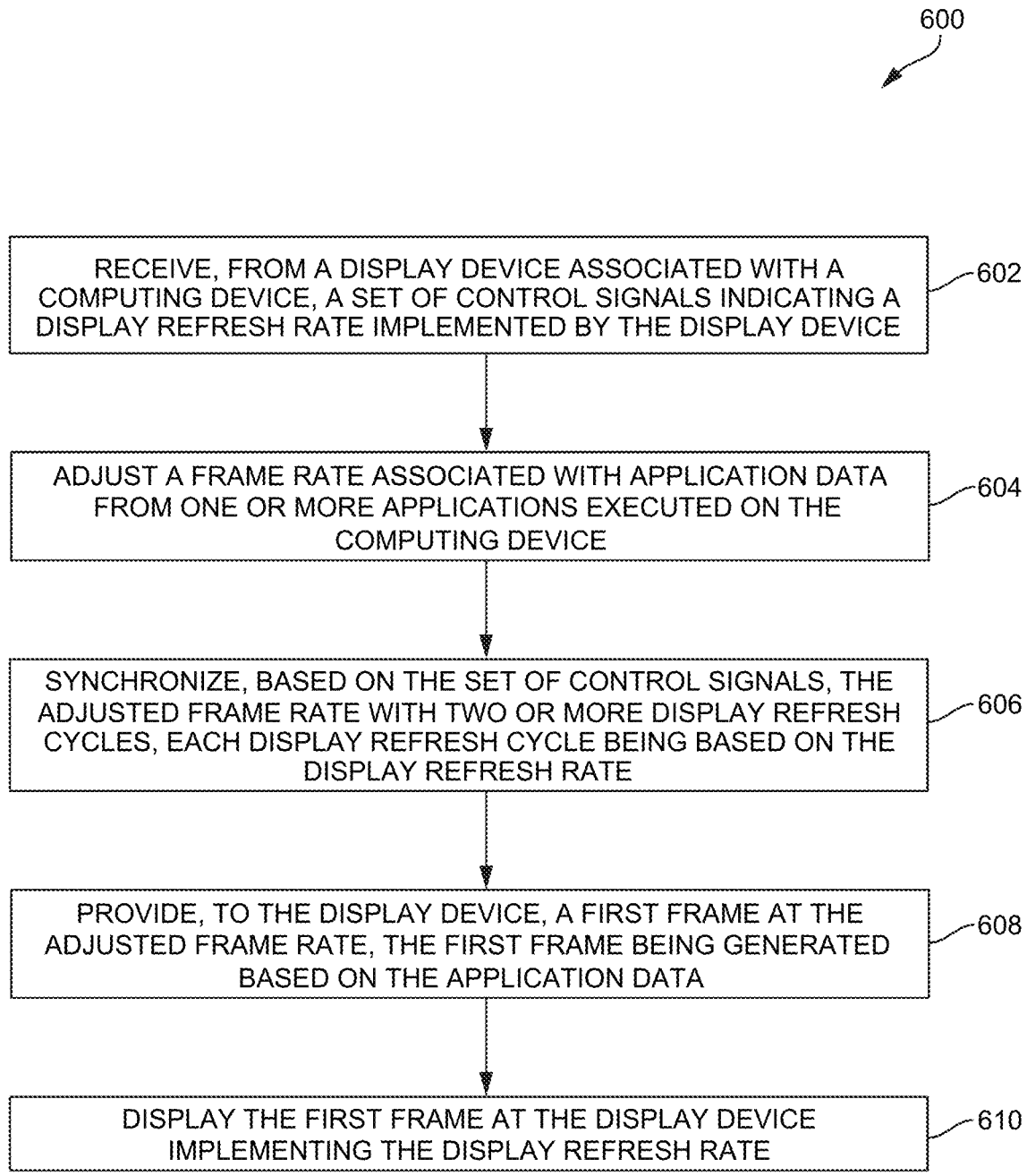
FIG. 6 is a flowchart illustrating an example method for dynamically switching frame rates of an electronic device without changing a refresh rate of a display associated with the electronic device, in accordance with some examples of the present disclosure.
Figure 7:
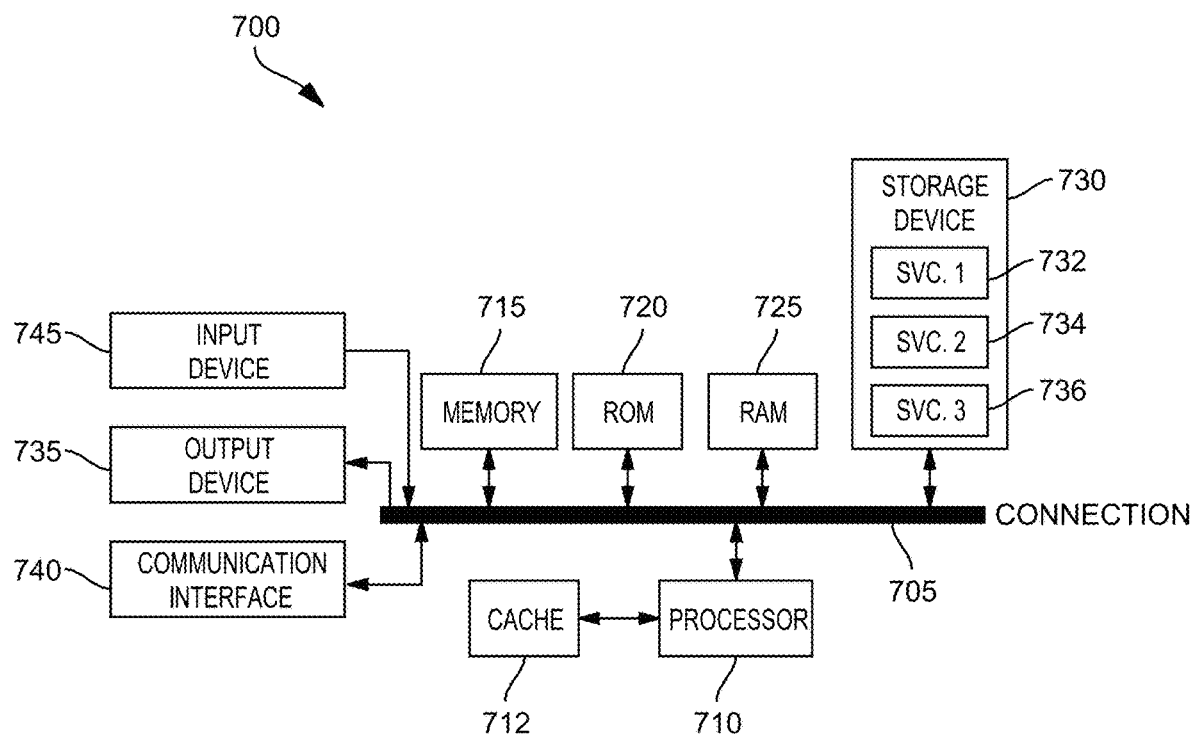
FIG. 7 illustrates an example computing device architecture, in accordance with some examples of the present disclosure.

The present technology will be described in greater detail in the following disclosure. The discussion begins with a description of example systems and technologies for displaying visual content and controlling frame rates for generating and/or displaying content, as illustrated in FIG. 1 through FIG. 5B. A description of an example method for dynamically switching frame rates, as illustrated in FIG. 6, will then follow. The discussion concludes with a description of an example computing device architecture including example hardware components suitable for displaying visual content and controlling frame rates, as illustrated in FIG. 7. The disclosure now turns to FIG. 1.

FIG. 1 is a diagram illustrating an example display system 100 in accordance to some examples of the present disclosure. The display system 100 can generate, receive, and display visual content, such as images (or frames), videos, graphics content, and/or any other type and/or combination of visual content. In this illustrative example, the display system 100 can include a display 102, a storage 104, and an application processor 110.

The display system 100 can be part of, or implemented by, an electronic device or multiple electronic devices. In some examples, the display system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a television, a gaming system, a head-mounted display (HMD), an extended reality (XR) device, a smart wearable device, or any other suitable electronic device(s). In some implementations, the display 102, the storage 104, the compute components 106, and the application processor 110 can be part of the same computing device. For example, in some cases, the display 102, the storage 104, and the application processor 110 can be integrated into a camera system, smartphone, laptop, tablet computer, smart wearable device, HMD, XR device, television, gaming system, and/or any other computing device.

In other implementations, one or more of the display 102, the storage 104, the compute components 106, and/or the application processor 110 can be part of, or implemented by, two or more separate computing devices. For example, in some cases, the storage 104, and/or the application processor 110 can be implemented by one or more electronic devices and the display 102 can be, or can be implemented by, a separate electronic device.

The display 102 can include an electronic display for displaying visual content such as, for example, images (or frames), videos, graphics, text, and/or any other type or combination of visual content. In some examples, the display 102 can include an electronic screen or display panel for displaying visual content. In some cases, the display 102 can include other electronic circuits or hardware, computer software, firmware, or any combination thereof, such as, for example, a processor, a memory, a buffer, a display interface, and/or any other software, firmware, hardware or circuitry. Non-limiting examples of a display 102 can include a light-emitting diode (LED) display, quantum LED (QLED) display, organic light-emitting diode (OLED) display, liquid crystal display (LCD), among others.

The display 102 can receive visual content such as frames from the application processor 110 and display the visual content. In some examples, when displaying visual content, the display 102 can charge one or more pixels (or pixel circuits) and/or LEDs on the display 102 to illuminate pixels and/or LEDs, change a brightness and/or color of the visual content displayed, etc. In some cases, the display 102 can illuminate pixels and/or LEDs by emitting charges or emission pulses at one or more rates. The one or more rates can represent and/or correspond to one or more refresh rates of the display 102 for displaying a number of frames per second (e.g., FPS).

In some examples, the display 102 can present visual content at one or more refresh rates (e.g., one or more frames per second). As further described herein, in some examples, the display 102 can maintain a certain refresh rate (e.g., a certain FPS), and the display system 100 can control and/or adjust the number of frames per second presented and/or updated by the display 102 by dynamically changing the frame rate (e.g., the FPS) implemented by the application processor 110. For example, the display system 100 can control and vary (e.g., via the application processor 110) the number of frames per second it sends to the display 102 for presentation. The display 102 can maintain a certain refresh rate and present the frames received from the application processor 110 at the frame rate associated with the application processor 110.

In some examples, the display system 100 may change (e.g., via the application processors 110) the frame rate used to deliver frames to the display 102 in order to reduce power consumption, adapt to changes in the visual content (e.g., changes in motion, scene changes, changes in color and/or optics, etc.) to be presented by the display 102, among other reasons. To avoid unwanted side-effects such as visual flickering, the display system 100 can adjust the frame rate without changing the refresh rate of the display 102. As a non-limiting illustrative example, the display system 100 can change the frame rate from 120 Hz to 60 Hz, while maintaining the refresh rate of the display 102 at 120 Hz. The display system 100 can later change the frame rate from 60 Hz to a different FPS rate, such as 120 Hz, while again maintaining the refresh rate of the display 102 at 120 Hz.

The storage 104 can be or include any storage device(s) for storing any type of data. The storage 104 can store data from any of the components of the display system 100. For example, the storage 104 can store data (e.g., frames, parameters, outputs, calculations, preferences, files, etc.) from the compute components 106 and/or the application processor 110.

The application processor 110 can include, for example and without limitation, a CPU 112, a GPU 114, a DSP 116, and/or an ISP 118. The application processor 110 can use the CPU 112, GPU 114, DSP 116, and/or ISP 118 to perform various compute operations such as image/video processing, graphics rendering, image (or frame) composition, synchronization (e.g., frame rate synchronization, signal synchronization, content synchronization, vertical synchronization, timing synchronization, buffer synchronization, output synchronization, etc.), machine learning, data processing, calculations, and/or any other operations. In some examples, the application processor 110 can use the CPU 112, GPU 114, DSP 116, and/or ISP 118 to render content (e.g., generate pixel values), compose content for presentation (e.g., compose rendered content into frames for presentation), transmit frames to the display 102 for presentation, control (e.g., adjust, maintain, manage, etc.) frame rates for generating and/or delivering frames to the display 102, synchronize display content and/or operations, and/or perform other operations as further described herein.

In some cases, the application processor 110 can include a memory 122 (e.g., random access memory (RAM), dynamic RAM, etc.) and one or more buffers 120. The memory 122 can include one or more memory devices, and can include any type of memory such as, for example, volatile memory (e.g., RAM, DRAM, SDRAM, DDR, static RAM, etc.), flash memory, flash-based memory (e.g., solid-state drive), etc. The memory 122 can be used to store data such as, for example, image data (e.g., frames), signaling data, processing parameters, metadata, event data, preferences, and/or any type of data. In some examples, the memory 122 can be used to store data from and/or used by the display 102, storage 104, the other compute components 106, and/or the application processor 110.

The one or more buffers 120 can include one or more hardware and/or software components that store data for future access. In some examples, the one or more buffers 120 can provide faster data access than the memory 122 or storage 104. For example, the one or more buffers 120 can include any type of cache or buffer such as, for example, a ring buffer, a system cache, an L2 cache, etc. In some cases, the one or more buffers 120 can be faster and/or more cost effective than the memory 122 and storage 104. In some cases, the one or more buffers 120 can be used to store/buffer and quickly serve certain types of data expected to be processed and/or requested in the future by one or more components (e.g., application processor 110) of the display system 100, such as frames. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some cases, the display 102, the application processor 110, and/or the display system 100 can include other electronic circuits or hardware, computer software, firmware, or any combination thereof, to perform any of the various operations described herein. While the display system 100 is shown to include certain components, one of ordinary skill will appreciate that the display system 100 can include more or fewer components (of the same and/or other components) than those shown in FIG. 1. For example, the display system 100 can also include, in some instances, one or more other memory devices (e.g., RAM, ROM, cache, and/or the like), one or more networking interfaces (e.g., wired and/or wireless communications interfaces and the like), one or more input devices, and/or other hardware or processing devices that are not shown in FIG. 1. An illustrative example of a computing device and hardware components that can be implemented with the display system 100 is described below with respect to FIG. 7.

Figure 2:
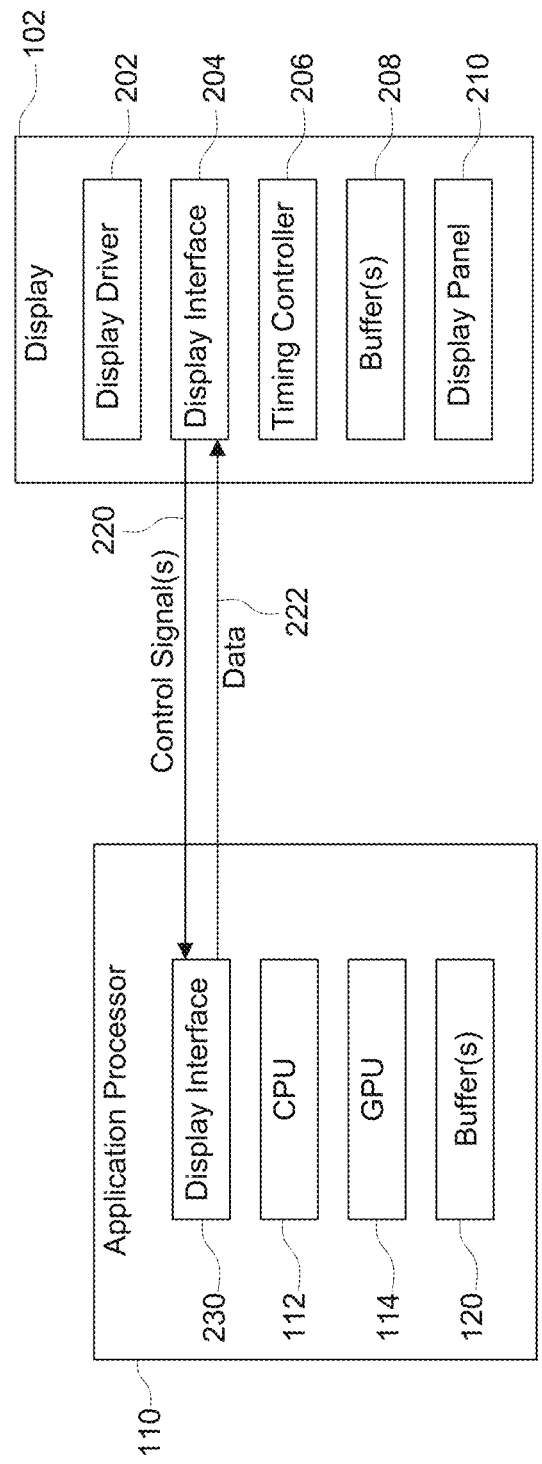
FIG. 2 is a simplified block diagram illustrating an example system for controlling a frame rate of a content display system, in accordance with some examples of the present disclosure.

FIG. 2 is a simplified block diagram illustrating an example system for controlling and varying a frame rate of the display system 100. In some cases, the system can control and/or maintain a refresh rate of the display 102. The system can also control and/or vary the frame rate delivered to the display 102. In this illustrative example, the display 102 can include a display driver 202 (and/or display driver integrated circuit and/or controller), a display interface 204, a timing controller 206, one or more buffers 208, and a display panel 210.

The display 102 can receive data 222 (e.g., one or more frames, control or synchronization signals, etc.) from the application processor 110 and use the data 222 to generate (e.g., draw) and display visual content on the display panel 210. In some cases, the display 102 can receive the data 222 and store the data 222 (or a portion thereof) in the one or more buffers 208 for later use (e.g., processing and/or display). The display panel 210 can include an electronic screen or display unit for presenting visual content. In some examples, the display panel 210 can include an LED display, a QLED display, an OLED display, an LCD, or any other electronic screen or display unit.

In some examples, the display driver 202 can use the data 222 from the application processor 110 to generate a video data output (e.g., a video signal) for the display 102. The display driver 202 can provide the video data output to the display panel 210 for presentation. In some cases, the display driver 202 can transmit control signal(s) 220 from the timing controller 206 to the application processor 110. The control signal 220 can include, for example, one or more heartbeats, timing signals, tearing effect (TE) signals, and/or the like. The control signal 220 can synchronize the timings of the application processor 110 and the display 102. In some examples, the control signal 220 can indicate (and/or inform the application processor 110) that the application processor 110 can, or is permitted to, send data (e.g., frames) to the display 102 for presentation at the display 102 and/or that the display 102 is ready to receive data from the application processor 110.

In some cases, the control signal 220 can depend on a refresh rate of the display 102. For example, display driver 202 can transmit the control signal 220 to the application processor 110 at specific intervals corresponding to the refresh rate of the display 102 (e.g., at the start of a new refresh cycle or prior to a new refresh cycle). In another example, display driver 202 can transmit the control signal 220 to the application processor 110 at the start of a new refresh cycle or prior to a new refresh cycle, and the control signal 220 can control, trigger, or indicate when the application processor 110 can send data (e.g., frames) to the display 102 for presentation and/or that the display has completed drawing visual content for presentation at the display panel 210.

In some examples, the control signal 220 can include a TE signal that prevents screen tearing. The display driver 202 can provide the TE signal to the display 102 and/or display panel 210 for vertical synchronization (vsync). In some cases, the TE signal can trigger redrawing of the visual content presented by the display panel 210 and/or can control (e.g., start) a refresh cycle of the display 102. The display driver 202 can also feed the TE signal to the application processor 110 to trigger and/or control the provisioning of data by the application processor 110.

The display 102 (and/or the display driver 202) can use the display interface 204 to communicate with the application processor 110 (e.g., to send and/or receive data). The display interface 204 can include a connection, bus, channel or path for transferring data between the display 102 and the application processor 110. In some cases, the display interface 204 can include a communication protocol for transferring data between the display 102 and the application processor 110. The communication protocol can define how data is transferred between the display 102 and the application processor 110 and/or instructions for transferring data between the display 102 and the application processor 110. In some examples, the display interface 204 can include a Mobile Industry Processor Interface (MIPI) display serial interface (DSI).

In the example of FIG. 2, the application processor 110 can include a display interface 230, one or more buffers 120, CPU 112, and GPU 114. As previously explained, in other examples, the application processor 110 can include other components such as a different processor, a memory, etc. The GPU 114 can be used to produce interface 230 (e.g., render, generate, etc.), modify, store, and/or send video signals (e.g., frames) as described herein.

The GPU 114 can render (e.g., using a rendering engine) visual content from one or more applications such as, for example, a video game, a media player, an XR application, a windowing system, an operating system, a productivity application, and/or any other application. For example, the GPU 114 can generate pixel values for application content from one or more applications. In some cases, the GPU 114 can store the rendered content (e.g., the generated pixel values) in the one or more buffers 120 and/or use the rendered content to compose (e.g., using a composer engine) the frame content for the display 102.

The GPU 114 can generate frames based on the rendered content. The GPU 114 can generate frames for one or more applications. In some examples, the GPU 114 can generate a frame for a single application. In other examples, the GPU 114 can generate a composite frame for multiple applications.

The application processor 110 can use the display interface 230 to send the frame(s) (e.g., data 222) generated by the GPU 114 to the display 102 for presentation at the display panel 210. In some cases, the application processor 110 can also use the display interface 230 to receive data (e.g., control signal 220) from the display 102. The display interface 230 can include a connection, bus, channel or path for transferring data between the display 102 and the application processor 110. In some cases, the display interface 230 can include a communication protocol for transferring data between the display 102 and the application processor 110. In some examples, the display interface 230 can include a MIPI DSI.

The application processor 110 can render (e.g., via the GPU 114), compose (e.g., via the GPU 114), and transmit (e.g., via the display interface 230) frames (e.g., data 222) to the display 102 at a certain frame rate (e.g., a certain FPS). In some cases, the rendering, composing, and transmitting of frames can be performed at a same frame rate. In other cases, the rendering, composing, and/or transmitting of frames can be performed at different frame rates.

The application processor 110 can use the control signal 220 from the display 102 to synchronize, trigger, and/or control the rendering, composing, and transmitting of frames. For example, the application processor 110 can use the control signal 220 to synchronize the rendering, composing, and transmitting of frames (and/or the frame rate(s) for rendering, composing, and transmitting frames). In some examples, the application processor can synchronize the rendering, composing, and transmitting of frames (and/or associated frame rate(s)) relative to the refresh rate and/or cycles of the display 102.

The application processor 110 can use the control signal 220 to dynamically vary the frame rate(s) used for rendering, composing, and transmitting frames. In some examples, the application processor 110 can set and/or vary the frame rate(s) relative to the refresh rate and/or cycle of the display 102. For example, the application processor 110 can match the frame rate for rendering, composing and transmitting frames to the refresh rate of the display 102 by triggering the rendering, composing, and transmitting of frames every time it receives a control signal (e.g., control signal 220) from the display 102. As previously noted, the control signal can be transmitted at intervals based on, or corresponding to, the refresh cycle of the display 102. The application processor 110 can therefore use control signals from the display 102 to synchronize the frame rate used by the application processor 110 with the refresh rate of the display 102.

To dynamically reduce the frame rate relative to the refresh rate of the display 102, the application processor 110 can trigger the rendering, composing, and transmitting of frames after receiving a certain number of control signals from the display 102, where the number of control signals is greater than one. For example, instead of triggering the rendering, composing, and transmitting of frames every time it receives a control signal from the display 102, the application processor 110 can trigger the rendering, composing, and transmitting of frames when it receives two or more control signals from the display 102. To illustrate, if the display 102 implements a 120 Hz refresh rate, the application processor 110 can receive a control signal from the display 102 at intervals associated with the 120 Hz refresh rate of the display 102. To dynamically switch a frame rate from 120 Hz to 60 Hz at runtime, the application processor 110 can trigger the rendering, composing, and transmitting of frames when it receives two control signals from the display 102, as opposed to every time it receives a control signal from the display 102. To switch back to a 120 Hz frame rate, the application processor 110 can dynamically switch to triggering the rendering, composing, and transmitting of frames every time it receives a control signal from the display 102.

As previously noted, the application processor 110 can dynamically (e.g., at runtime) switch or vary the frame rate used for rendering, composing and/or sending frames without also changing the refresh rate of the display 102. This way, the application processor 110 can dynamically switch frame rates at runtime to optimize power consumption, adapt or adjust to the application content being displayed, etc., without causing the visual flickering often experienced when dynamically varying the refresh rate of the display 102.

The application processor 110 can switch from a current frame rate to a different frame rate, without changing a display refresh rate of the display 102. In some examples, the switching of the frame rate can be triggered by one or more control signals, a power consumption at the display system 100, and/or one or more characteristics of application data used to generate the frames for display at the display 102. For example, switching the frame rate can be triggered by a power consumption threshold and/or a current power consumption at the display system 100. In some examples, switching the frame rate can be triggered to change a power consumption (e.g., to reduce power consumption) at the display system 100.

In another example, switching the frame rate can be triggered by one or more characteristics of application data used to generate the frames for display at the display 102. The application data can be associated with one or more applications executed at the display system 100. In some cases, the one or more characteristics of the application data can include an amount of changes in the application data relative to previous application data from the one or more applications and/or an amount of motion reflected in the application data relative to the previous application data.

Figure 3:
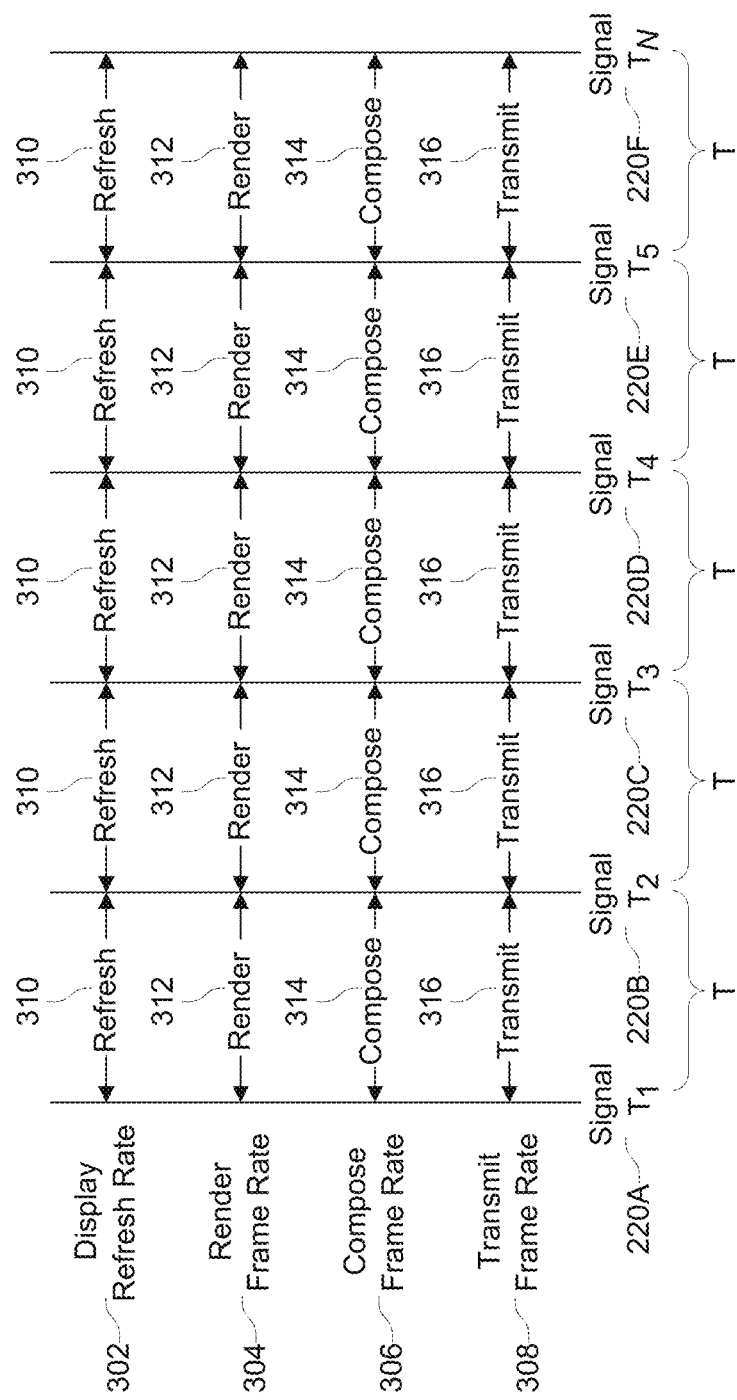
FIG. 3 is a schematic diagram illustrating an example display refresh rate and an example frame rate used to generate, transmit and display frames over time, in accordance with some examples of the present disclosure.

FIG. 3 is a schematic diagram illustrating an example display refresh rate and an example frame rate used to generate, transmit and display frames over time. The display 102 can generate control signals 220A through 220F at time intervals t corresponding to the display refresh rate 302. In the example display refresh rate 302, the display refresh cycles 310 correspond to the time intervals t between the control signals 220A through 220F. For example, each display refresh cycle 310 can start and end within a time interval t between two control signals. At each refresh cycle, the display 102 can refresh or update the visual content presented at the display panel 210.

The render frame rate 304, compose frame rate 306 and transmit frame rate 308 also correspond to the time intervals t between the control signals 220A through 220F. For example, the render frame rate 304 for each render action 312 can start and end within a time interval t between two control signals. The application processor 110 can start and complete each render action 312 within the time interval t between two control signals.

The compose frame rate 306 for each compose action 314 can also start and end within a time interval t between two control signals. The application processor 110 can start and complete each compose action 314 within the time interval t between two control signals. The transmit frame rate 308 for each transmit action 316 can similarly start and end within a time interval t between two control signals. The application processor 110 can transmit a frame to the display 102 within the time interval t between two control signals (e.g., at the beginning, at the end, etc.).

In the example shown in FIG. 3, the render frame rate 304, compose frame rate 306 and transmit frame rate 308 are the same and also match the display refresh rate 302. However, in other examples, the render frame rate 304, compose frame rate 306 and/or transmit frame rate 308 can differ at one or more times. Moreover, in other examples, the render frame rate 304, compose frame rate 306 and/or transmit frame rate 308 can differ from the display refresh rate 302 and/or can dynamically switch from a frame rate matching the display refresh rate 302 to a different frame rate, and vice versa.

Figure 4:
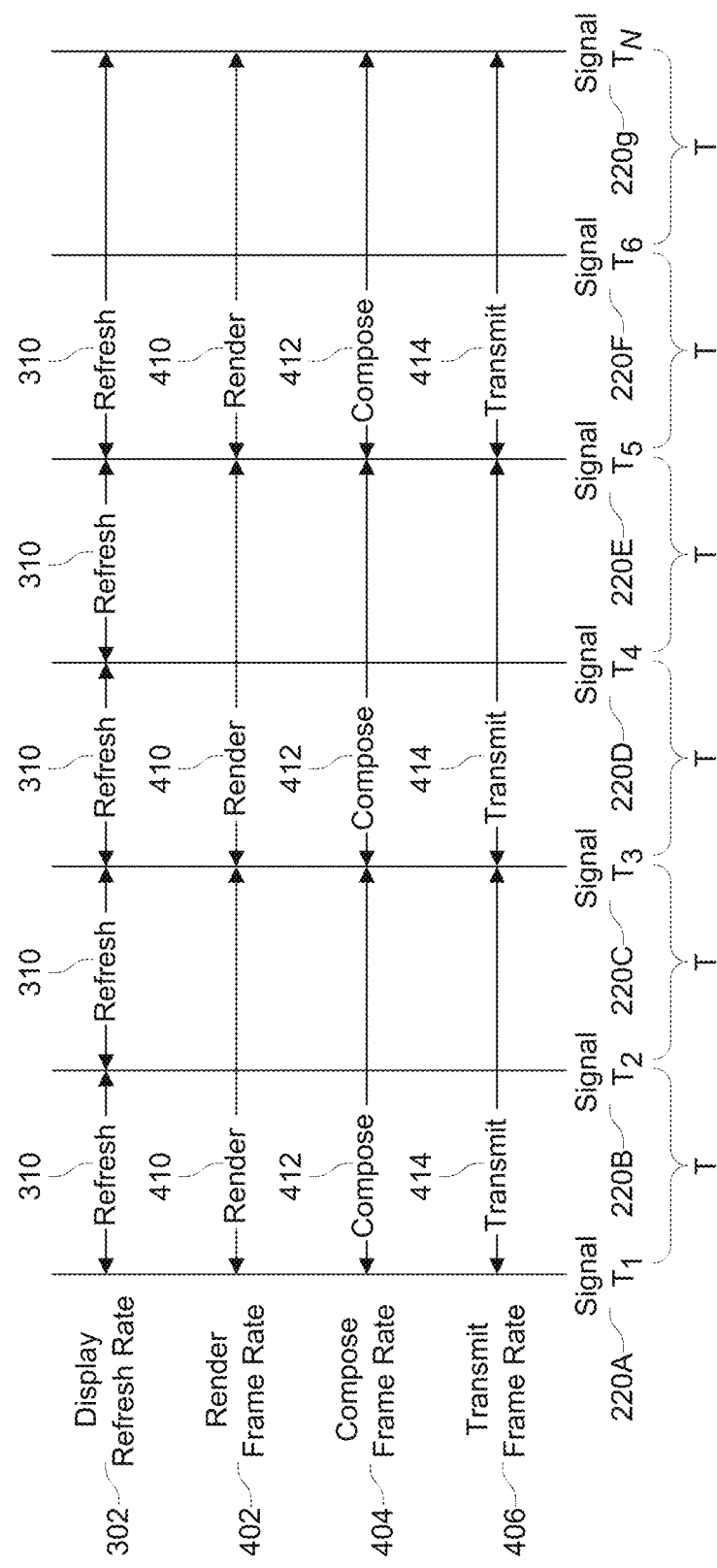
FIG. 4 is a schematic diagram illustrating a display refresh rate and a frame rate that differs from the display refresh rate, in accordance with some examples of the present disclosure.

FIG. 4 is a schematic diagram illustrating a display refresh rate and a frame rate that differs from the display refresh rate. The application processor 110 can dynamically switch to render frame rate 402, compose frame rate 404 and transmit frame rate 406 while the display 102 can maintain the display refresh rate 302. In this example, the render frame rate 402, compose frame rate 404 and transmit frame rate 406 are different than the display refresh rate 302 as well as the render frame rate 304, compose frame rate 306 and transmit frame rate 308 shown in FIG. 3.

The render frame rate 402, compose frame rate 404 and transmit frame rate 406 each corresponds to multiple time intervals t between the control signals 220A through 220F. The render frame rate 402 for each render action 410 can start and end within two time intervals (2t) between three control signals. For example, a first render action 410 can start and end within a time interval from control signal 220A to control signal 220C, a second render action 410 can start and end within a time interval from control signal 220C to control signal 220E, and a third render action 410 can start and end within a time interval from control signal 220E to control signal 220G. As illustrated, the render frame rate 402 for each render action 410 in this example spans two display refresh cycles. The application processor 110 can start and complete each render action 410 within the two display refresh cycles.

The compose frame rate 404 for each compose action 412 can similarly start and end within two time intervals (2t) between three control signals. For example, a first compose action 412 can start and end within a time interval from control signal 220A to control signal 220C, a second compose action 412 can start and end within a time interval from control signal 220C to control signal 220E, and a third compose action 412 can start and end within a time interval from control signal 220E to control signal 220G. As illustrated, the compose frame rate 404 for each compose action 412 in this example spans two display refresh cycles. The application processor 110 can start and complete each compose action 412 within the two display refresh cycles.

The transmit frame rate 406 for each transmit action 414 can also start and end within two time intervals (2t) between three control signals. For example, a first transmit action 414 can start and end within a time interval from control signal 220A to control signal 220C, a second transmit action 414 can start and end within a time interval from control signal 220C to control signal 220E, and a third transmit action 414 can start and end within a time interval from control signal 220E to control signal 220G. As illustrated, the transmit frame rate 406 for each transmit action 414 in this example spans two display refresh cycles. The application processor 110 can start and complete each transmit action 414 within the two display refresh cycles.

As previously noted, the application processor 110 can dynamically change the render frame rate, the compose frame rate, and/or the transmit frame rate without changing the display refresh rate of the display 102. In some examples, the dynamic changing of the render frame rate, the compose frame rate, and/or the transmit frame rate can be triggered by one or more control signals, a power consumption at the display system 100, and/or one or more characteristics of application data used to generate the frames for display at the display 102. For example, the dynamic changing of the render frame rate, the compose frame rate, and/or the transmit frame rate can be triggered by a power consumption threshold and/or a current power consumption at the display system 100. In some examples, the dynamic changing of the render frame rate, the compose frame rate, and/or the transmit frame rate can be triggered to change a power consumption (e.g., to reduce power consumption) at the display system 100.

In another example, the dynamic changing of the render frame rate, the compose frame rate, and/or the transmit frame rate can be triggered by one or more characteristics of application data used to generate the frames for display at the display 102. The application data can be associated with one or more applications executed at the display system 100. In some cases, the one or more characteristics of the application data can include an amount of change in the application data relative to previous application data from the one or more applications and/or an amount of motion reflected in the application data relative to the previous application data.

Figure 5A:
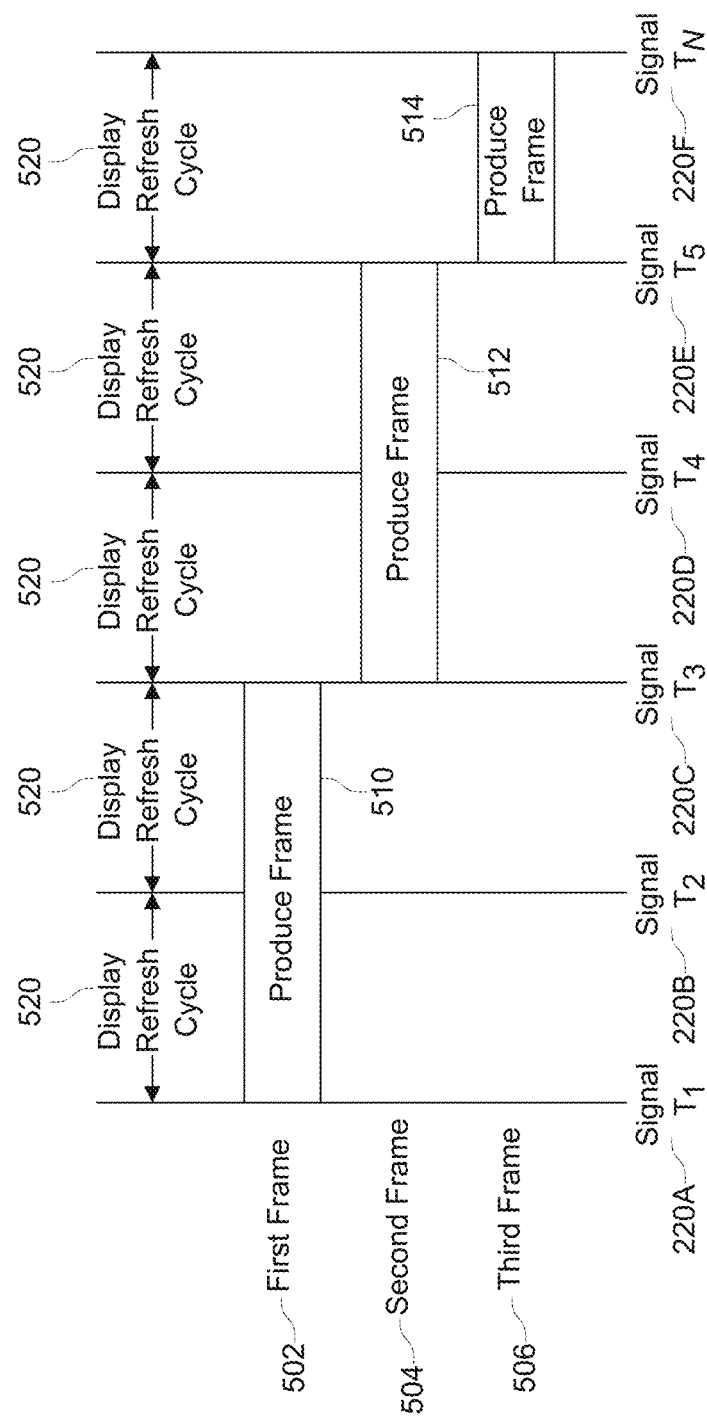
FIG. 5A is an example timing diagram illustrating frames generated and displayed at frame rates that differ from a display fresh rate, in accordance with some examples of the present disclosure.

FIG. 5A is an example timing diagram illustrating frames generated and displayed at frame rates that differ from a display fresh rate. In this example, the application processor 110 synchronizes the frame rate it uses to produce (e.g., render, compose, and transmit using the GPU 114) frames for display at the display 102, with multiple display refresh cycles used by the display 102 to refresh content presented at the display panel 210.

As illustrated, the display 102 can refresh the content presented at the display panel 210 at every display refresh cycle 520. For example, the display 102 can refresh the display panel 210 at a first display refresh cycle 520 corresponding to a time interval from control signal 220A to control signal 220B, a second display refresh cycle 520 corresponding to a time interval from control signal 220B to control signal 220C, a third display refresh cycle 520 corresponding to a time interval from control signal 220C to control signal 220D, a fourth display refresh cycle 520 corresponding to a time interval from control signal 220D to control signal 220E, and a fifth display refresh cycle 520 corresponding to a time interval from control signal 220E to control signal 220F.

The application processor 110 can dynamically vary the frame rate it implements to produce (e.g., render, compose, and transmit) frames for display at the display 102, without changing the display refresh rate at the display 102. For example, the application processor 110 can produce 510 (e.g., render, compose, and transmit) the first frame 502 at a frame rate corresponding to a time interval from control signal 220A to control signal 220C. The application processor 110 can produce 512 (e.g., render, compose, and transmit) the second frame 504 at the frame rate corresponding to the time interval from control signal 220C to control signal 220E, which is the same frame rate as the frame rate used to produce 510 the first frame 502. Each of the frame rates used to produce 510, 512 the first frame 502 and the second frame 504 includes two display refresh cycles 520. The frame rate used to produce 510 the first frame 502 is synchronized with two display refresh cycles 520, and the frame rate used to produce 512 the second frame 504 is similarly synchronized with two display refresh cycles 520.

In this example, the application processor 110 can dynamically switch the frame rate used to produce 514 (e.g., render, compose, and transmit) the third frame 506. As shown, the application processor 110 can produce 514 the third frame 506 at a different frame rate corresponding to the time interval from control signal 220E to control signal 220F. The different frame rate used to produce 514 the third frame 506 is the same as (and/or synchronized with) the refresh rate associated with the display refresh cycle 520, but different from the frame rate used to produce 510, 512 the first frame 502 and the second frame 504.

Figure 5B:
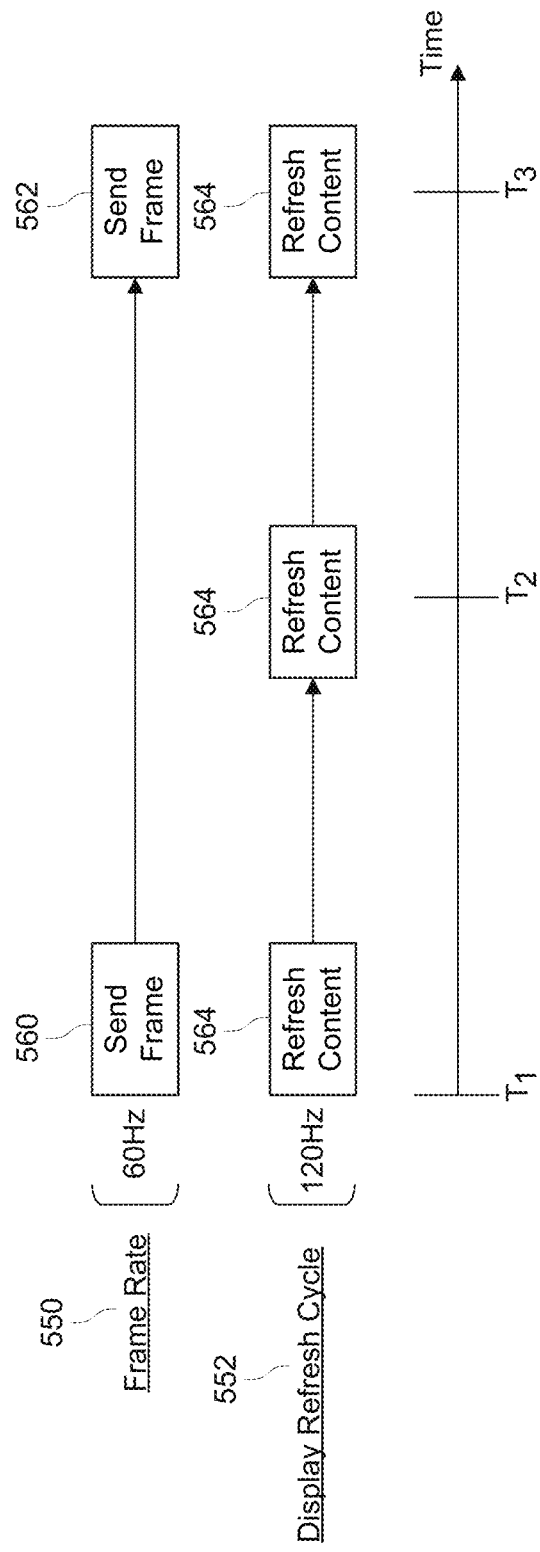
FIG. 5B is a diagram illustrating an example frame rate synchronized with multiple display refresh cycles, in accordance with some examples of the present disclosure.

FIG. 5B is a diagram illustrating an example frame rate 550 synchronized with multiple display refresh cycles 552. The frame rate 550 can be used by the application processor 110 to render, compose and transmit frames to the display 102 for presentation at the display 102. Each display refresh cycle 552 can be used by the display 102 to refresh content presented at the display 102. The frame rate 550 can be dynamically adjusted as described herein and synchronized with one or more display refresh cycles 552 implemented by the display 102.

For illustration purposes, FIG. 5B shows a frame rate 550 of 60 Hz and a display refresh cycle of 120 Hz. However, one of ordinary skill in the art will recognize that other examples can include different frame rates and/or display refresh rates. In this example, at time $T_1$, the application processor 110 sends 560 a frame to the display 102 for presentation at the display 102. At $T_3$, the application processor 110 sends 562 a new frame to the display 102 for presentation at the display 102. Here, based on the frame rate 550, the application processor 110 does not send a new frame at $T_2$ as it does not generate and send the new frame until $T_3$.

On the other hand, based on the display refresh cycle 552, the display 102 refreshes 564 content presented at the display 102 at $T_1$, $T_2$, and $T_3$. The frame rate 550 in this example is synchronized with two display refresh cycles 552. The display 102 can refresh content twice for every frame it receives from the application processor 110. At $T_2$, the display 102 has not yet received a new frame from the application processor 110 to present new frame content at the display 102. After $T_1$, the display 110 may not present new frame content until it receives a new frame from the application processor 110 at $T_3$.

Having disclosed example systems, architectures, and technologies, the disclosure now turns to the example method 600 for dynamically switching frame rates without changing a display refresh rate, as shown in FIG. 6. The steps outlined herein are non-limiting examples provided for illustration purposes, and can be implemented in any combination thereof, including combinations that exclude, add, or modify certain steps.

At block 602, the method 600 can include receiving, from a display device (e.g., display 102) associated with a computing device (e.g., display system 100), a set of control signals (e.g., control signals 220A, 220B, 220C, 220D, 220E, 220F, 220G) indicating a display refresh rate (e.g., display refresh rate 302) implemented by the display device. In some examples, the set of control signals can be received by an application processor (e.g., application processor 110) at the computing device.

The set of control signals can include, for example, a TE signal, a timing signal, a vsync signal, a heartbeat signal, and/or the like. In some examples, each control signal of the set of control signals can indicate a transition between display refresh cycles (e.g., display refresh cycles 520) and/or a beginning or end of a display refresh cycle. In some cases, each control signal of the set of control signals can indicate that the display device is ready to receive a new frame, is ready to refresh (e.g., update, draw, etc.) a visual content displayed at the display device, and/or has completed refreshing visual content displayed at the display device.

At block 604, the method 600 can include adjusting a frame rate associated with application data from one or more applications executed on the computing device. The frame rate can be adjusted dynamically at runtime. In some examples, the application data can include image data, visual content data, and/or graphic data from the one or more applications. In some cases, adjusting the frame rate can include dynamically switching from a current frame rate to a different frame rate during a runtime of the one or more applications.

In some cases, the adjusted frame rate can include or represent a render frame rate (e.g., render frame rate 304 or 402), a compose frame rate (e.g., compose frame rate 306 or 404), and/or a transmit frame rate (e.g., transmit frame rate 308 or 406).

In some examples, a first time interval associated with the adjusted frame rate is different than a second time interval associated with the display refresh rate. In other words, the adjusted frame rate can be different (e.g., can represent and/or define a different frequency or rate) than the display refresh rate.

In some cases, the frame rate can be adjusted based on, and/or adjusting the frame rate can be triggered by, the set of control signals, a power consumption at the computing device, and/or one or more characteristics of the application data. For example, the frame rate can be adjusted to span an interval corresponding to receipt of a number of control signals from the display device. As another example, the frame rate can be adjusted based on (and/or the frame rate adjustment can be triggered by) a power consumption threshold, a current power consumption, and/or to change a power consumption (e.g., to reduce power consumption) at the computing device.

As another example, the frame rate can be adjusted based on (and/or the frame rate adjustment can be triggered by) one or more characteristics of the application data. In some cases, the one or more characteristics of the application data can include an amount of changes in the application data relative to previous application data from the one or more applications and/or an amount of motion reflected in the application data relative to the previous application data.

At block 606, the method 600 can include synchronizing, based on the set of control signals, the adjusted frame rate with two or more display refresh cycles (e.g., two or more display refresh cycles 520). In some examples, each display refresh cycle can be based on the display refresh rate. For example, a display refresh cycle can span a time interval corresponding to the display refresh rate. In some cases, synchronizing the adjusted frame rate with two or more display refresh cycles can include aligning generation (e.g., rendering, composing) and transmission of one or more frames with the two or more display refresh cycles (e.g., with the beginning and/or end of the two or more display refresh cycles.

At block 608, the method 600 can include providing, to the display device, a first frame (e.g., first frame 502) at the adjusted frame rate. The first frame can be generated based on the application data. For example, the first frame can be generated by rendering the application data (e.g., generating pixel values for the application data) and composing the first frame based on the rendering of the application data (e.g., based on the generated pixel values).

In some cases, providing the first frame at the adjusted frame rate can include rendering the application data at (or within) the adjusted frame rate, composing the first frame at (or within) the adjusted frame, and/or transmitting the first frame to the display device at (or within) the adjusted frame rate.

In some cases, providing the first frame at the adjusted frame rate can include generating and transmitting the first frame at the adjusted frame rate. In some examples, providing the first frame at the adjusted frame rate can include transmitting, to the display device, the first frame at a time interval corresponding to the two or more display refresh cycles.

At block 610, the method 600 can include displaying the first frame at the display device implementing the display refresh rate. The display device can display the first frame while implementing the display refresh rate (e.g., without modifying the display refresh rate).

In some examples, synchronizing the adjusted frame rate with two or more display refresh cycles can include triggering the first frame to be provided to the display device at a time interval corresponding to the two or more display refresh cycles.

In some examples, the frame rate is adjusted during a runtime of the one or more applications. In some cases, the frame rate is adjusted and the first frame is displayed without changing the display refresh rate implemented by the display device.

In some aspects, the method 600 can include providing, to the display device, a plurality of frames at the adjusted frame rate, and displaying the plurality of frames at the display device without modifying the display refresh rate at the display device. In some examples, the plurality of frames can be generated based on additional application data associated with the one or more applications.

In some cases, providing the plurality of frames at the adjusted frame rate can include, every two or more display refresh cycles, transmitting, to the display device, a different frame from the plurality of frames.

In some aspects, the method 600 can include switching from the adjusted frame rate to a different frame rate; synchronizing, based on one or more additional control signals received from the display device, the different frame rate with a display refresh cycle associated with the display refresh rate; providing, to the display device, a second frame at the different frame rate; and displaying the second frame at the display device without modifying the display refresh rate at the display device. In some examples, the different frame rate can be equal to (e.g., can match, can be the same as, can include a same time interval, etc.) the display refresh rate.

In some cases, the second frame can be generated based on additional application data associated with the one or more applications, and the switching from the adjusted frame rate to the different frame rate can be performed at runtime. In some examples, providing the second frame can include rendering, composing, and transmitting the second frame at the different frame rate.

In some examples, the method 600 may be performed by one or more computing devices or apparatuses. In one illustrative example, the method 600 can be performed by the display system 100 shown in FIG. 1 and/or one or more computing devices with the computing device architecture 700 shown in FIG. 7. In some cases, such a computing device or apparatus may include a processor, microprocessor, microcomputer, or other component of a device that is configured to carry out the steps of the method 600. In some examples, such computing device or apparatus may include a display panel for presenting visual content. For example, the computing device can include a smartphone, a head-mounted display, a mobile device, a personal computer, or other suitable device. In some examples, such computing device or apparatus may include a camera configured to capture one or more images or videos. In some cases, such computing device may include one or more sensors for capturing sensor data. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 600 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 7 illustrates an example computing device architecture 700 of an example computing device which can implement various techniques described herein. For example, the computing device architecture 700 can implement at least some portions of the display system 100 shown in FIG. 1, and perform dynamic frame rate switching operations as described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics.

The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device. In some instances, multimodal computing devices can enable a user to provide multiple types of input to communicate with the computing device architecture 700. The communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 175, read only memory (ROM) 720, and hybrids thereof. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Example 1: An apparatus comprising memory; and one or more processors coupled to the memory, the one or more processors being configured to: receive, from a display device, a set of control signals indicating a display refresh rate implemented by the display device; adjust a frame rate associated with application data from one or more applications executed on the apparatus; synchronize, based on the set of control signals, the adjusted frame rate with two or more display refresh cycles, each display refresh cycle being based on the display refresh rate; provide, to the display device, a first frame at the adjusted frame rate, the first frame being generated based on the application data; and display the first frame at the display device implementing the display refresh rate.

Example 2: An apparatus according to Example 1, wherein the frame rate is adjusted during a runtime of the one or more applications, and wherein the frame rate is adjusted and the first frame is displayed without changing the display refresh rate implemented by the display device.

Example 3: An apparatus according to Example 1 or 2, wherein a first time interval associated with the adjusted frame rate is different than a second time interval associated with the display refresh rate.

Example 4: An apparatus according to any of Examples 1 to 3, wherein providing the first frame at the adjusted frame rate comprises at least one of rendering the application data at the adjusted frame rate, composing the first frame at the adjusted frame, and transmitting the first frame to the display device at the adjusted frame rate.

Example 5: An apparatus according to any of Examples 1 to 4, wherein providing the first frame at the adjusted frame rate comprises generating and transmitting the first frame at the adjusted frame rate.

Example 6: An apparatus according to any of Examples 1 to 5, wherein providing the first frame at the adjusted frame rate comprises transmitting, to the display device, the first frame at a time interval corresponding to the two or more display refresh cycles.

Example 7: An apparatus according to any of Examples 1 to 6, wherein synchronizing the adjusted frame rate with two or more display refresh cycles comprises triggering the providing of the first frame to the display device at a time interval corresponding to the two or more display refresh cycles.

Example 8: An apparatus according to any of Examples 1 to 7, wherein the one or more processors are configured to: provide, to the display device, a plurality of frames at the adjusted frame rate, the plurality of frames being generated based on additional application data associated with the one or more applications; and display the plurality of frames at the display device without modifying the display refresh rate at the display device.

Example 9: An apparatus according to Example 8, wherein providing the plurality of frames at the adjusted frame rate comprises: every two or more display refresh cycles, transmitting, to the display device, a different frame from the plurality of frames.

Example 10: An apparatus according to any of Examples 1 to 9, wherein the one or more processors are configured to: switch from the adjusted frame rate to a different frame rate, the different frame rate being equal to the display refresh rate; synchronize, based on one or more additional control signals received from the display device, the different frame rate with a display refresh cycle associated with the display refresh rate; provide, to the display device, a second frame at the different frame rate; and displaying the second frame at the display device without modifying the display refresh rate at the display device.

Example 11: An apparatus according to Example 10, wherein the second frame is generated based on additional application data associated with the one or more applications, and wherein the switching from the adjusted frame rate to the different frame rate is performed at runtime.

Example 12: An apparatus according to Examples 10 or 11, wherein providing the second frame comprises rendering, composing, and transmitting the second frame at the different frame rate.

Example 13: An apparatus according to any of Examples 1 to 12, wherein the frame rate is adjusted based on at least one of the set of control signals, a power consumption at the computing device, and one or more characteristics of the application data.

Example 14: An apparatus according to any of Examples 1 to 13, wherein the frame rate is adjusted based on one or more characteristics of the application data, wherein the one or more characteristics of the application data comprise at least one of an amount of changes in the application data relative to previous application data from the one or more applications and an amount of motion reflected in the application data relative to the previous application data.

Example 15: An apparatus according to any of Examples 1 to 14, wherein the apparatus is a mobile computing device.

Example 16: An apparatus according to any of Examples 1 to 15, wherein the apparatus comprises the display device.

Example 17: A method comprising: receiving, from a display device associated with a computing device, a set of control signals indicating a display refresh rate implemented by the display device; adjusting a frame rate associated with application data from one or more applications executed on the computing device; synchronizing, based on the set of control signals, the adjusted frame rate with two or more display refresh cycles, each display refresh cycle being based on the display refresh rate; providing, to the display device, a first frame at the adjusted frame rate, the first frame being generated based on the application data; and displaying the first frame at the display device implementing the display refresh rate.

Example 18: A method according to Example 17, wherein the frame rate is adjusted during a runtime of the one or more applications, and wherein the frame rate is adjusted and the first frame is displayed without changing the display refresh rate implemented by the display device.

Example 19: A method according to Example 17 or 18, wherein a first time interval associated with the adjusted frame rate is different than a second time interval associated with the display refresh rate.

Example 20: A method according to any of Examples 17 to 19, wherein providing the first frame at the adjusted frame rate comprises at least one of rendering the application data at the adjusted frame rate, composing the first frame at the adjusted frame, and transmitting the first frame to the display device at the adjusted frame rate.

Example 21: A method according to any of Examples 17 to 20, wherein providing the first frame at the adjusted frame rate comprises generating and transmitting the first frame at the adjusted frame rate.

Example 22: A method according to any of Examples 17 to 21, wherein providing the first frame at the adjusted frame rate comprises transmitting, to the display device, the first frame at a time interval corresponding to the two or more display refresh cycles.

Example 23: A method according to any of Examples 17 to 22, wherein synchronizing the adjusted frame rate with two or more display refresh cycles comprises triggering the providing of the first frame to the display device at a time interval corresponding to the two or more display refresh cycles.

Example 24: A method according to any of Examples 17 to 23, further comprising: providing, to the display device, a plurality of frames at the adjusted frame rate, the plurality of frames being generated based on additional application data associated with the one or more applications; and displaying the plurality of frames at the display device without modifying the display refresh rate at the display device.

Example 25: A method according to Example 24, wherein providing the plurality of frames at the adjusted frame rate comprises: every two or more display refresh cycles, transmitting, to the display device, a different frame from the plurality of frames.

Example 26: A method according to any of Examples 17 to 25, further comprising: switching from the adjusted frame rate to a different frame rate, the different frame rate being equal to the display refresh rate; synchronizing, based on one or more additional control signals received from the display device, the different frame rate with a display refresh cycle associated with the display refresh rate; providing, to the display device, a second frame at the different frame rate; and displaying the second frame at the display device without modifying the display refresh rate at the display device.

Example 27: A method according to Example 26, wherein the second frame is generated based on additional application data associated with the one or more applications, and wherein the switching from the adjusted frame rate to the different frame rate is performed at runtime.

Example 28: A method according to Examples 26 or 27, wherein providing the second frame comprises rendering, composing, and transmitting the second frame at the different frame rate.

Example 29: A method according to any of Examples 17 to 28, wherein the frame rate is adjusted based on at least one of the set of control signals, a power consumption at the computing device, and one or more characteristics of the application data.

Example 30: A method according to any of Examples 17 to 29, wherein the frame rate is adjusted based on one or more characteristics of the application data, wherein the one or more characteristics of the application data comprise at least one of an amount of changes in the application data relative to previous application data from the one or more applications and an amount of motion reflected in the application data relative to the previous application data.

A non-transitory computer-readable medium having stored thereon instructions which, when executed by one or more processors, cause the one or more processors to perform a method according to any of Examples 17 to 30.

An apparatus comprising means for performing a method according to any of Examples 17 to 30.

What is claimed is:
1. An apparatus comprising:
   a display device;
   a memory; and
   a processor system coupled to the memory, the processor system configured to cause the apparatus to:
      determine a first frame rate based on a characteristic of a first application executed on the apparatus;
      obtain first rendered application content based on application data from the first application, wherein the first rendered application content is generated at the first frame rate in synchronization with a first number of display refresh cycles, each display refresh cycle being based on a physical display refresh rate of the display device;

deliver the first rendered application content to the display device at the first frame rate;

display the first rendered application content at the display device implementing the physical display refresh rate;

determine a second frame rate based on a characteristic of a second application executed on the apparatus, wherein the second frame rate is different than the first frame rate;

obtain second rendered application content based on application data from the second application, wherein the second rendered application content is generated at the second frame rate in synchronization with a second number of the display refresh cycles;

deliver the second rendered application content to the display device at the second frame rate; and display the second rendered application content at the display device implementing the physical display refresh rate.

2. The apparatus of claim 1, wherein the first rendered application content is generated in response to two or more control signals, the two or more control signals being provided at the first frame rate.

3. The apparatus of claim 1, wherein the first frame rate is adjusted during a runtime of the first application without changing the physical display refresh rate implemented by the display device.

4. The apparatus of claim 1, wherein the first frame rate is associated with a first time interval, the first time interval being different than a second time interval associated with the physical display refresh rate.

5. The apparatus of claim 1, wherein the physical display refresh rate is 120 Hz.

6. The apparatus of claim 1, wherein the first rendered application content includes pixel values generated for the first rendered application content.

7. The apparatus of claim 1, wherein, to deliver the first rendered application content at the first frame rate, the processor system is configured to:

every two or more display refresh cycles of the first number of display refresh cycles, deliver, to the display device, a different frame from the first rendered application content.

8. The apparatus of claim 1, wherein the processor system is configured to:

switch from the first frame rate to the second frame rate.

9. The apparatus of claim 8, wherein the processor system is configured to switch from the first frame rate to the second frame rate at runtime of the second application.

10. The apparatus of claim 1, wherein the first frame rate is determine based on at least one of a power consumption at the apparatus or one or more characteristics of the application data from the first application.

11. The apparatus of claim 10, wherein the one or more characteristics of the application data from the first application comprise at least one of an amount of changes in the application data relative to previous application data from the first application or an amount of motion reflected in the application data relative to the previous application data.

12. The apparatus of claim 1, wherein the apparatus is a mobile phone, a wearable device, a mobile computing device, or a head-mounted device.

13. The apparatus of claim 1, wherein the display device is an OLED display.

14. A method comprising:

determine a first frame rate based on a characteristic of a first application executed on an apparatus including a display device;

obtain first rendered application content based on application data from the first application, wherein the first rendered application content is generated at the first frame rate in synchronization with a first number of display refresh cycles, each display refresh cycle being based on a physical display refresh rate of the display device;

deliver the first rendered application content to the display device at the first frame rate;

display the first rendered application content at the display device implementing the physical display refresh rate;

determine a second frame rate based on a characteristic of a second application executed on the apparatus, wherein the second frame rate is different than the first frame rate;

obtain second rendered application content based on application data from the second application, wherein the second rendered application content is generated at the second frame rate in synchronization with a second number of the display refresh cycles;

deliver the second rendered application content to the display device at the second frame rate; and display the second rendered application content at the display device implementing the physical display refresh rate.

15. The method of claim 14, wherein the first rendered application content is generated in response to two or more control signals, the two or more control signals being provided at the first frame rate.

16. The method of claim 14, wherein the first frame rate is adjusted during a runtime of the first application without changing the physical display refresh rate implemented by the display device.

17. The method of claim 14, wherein the first frame rate is associated with a first time interval, the first time interval being different than a second time interval associated with the physical display refresh rate.

18. The method of claim 14, wherein the physical display refresh rate is 120 Hz.

19. The method of claim 14, wherein the first rendered application content includes pixel values generated for the first rendered application content.

20. The method of claim 14, wherein delivering the first rendered application content at the first frame rate comprises:

every two or more display refresh cycles of the first number of display refresh cycles, delivering, to the display device, a different frame from the first rendered application content.

21. The method of claim 14, further comprising:

switching from the first frame rate to the second frame rate.

22. The method of claim 21, further comprising switching from the first frame rate to the second frame rate at runtime of the second application.

23. The method of claim 14, wherein the first frame rate is determine based on at least one of a power consumption at the apparatus or one or more characteristics of the application data from the first application.

24. The method of claim 23, wherein the one or more characteristics of the application data from the first application comprise at least one of an amount of changes in the application data relative to previous application data from the first application or an amount of motion reflected in the application data relative to the previous application data.

25. The method of claim 14, wherein the display device is an OLED display.

* * * * *